United States Patent [19]

Baer et al.

[11] Patent Number: 4,733,235

[45] Date of Patent: Mar. 22, 1988

[54] CAPACITANCE TYPE DISPLACEMENT MEASURING INSTRUMENT

[75] Inventors: James A. Baer, Menlo Park; Charles B. Clark, Los Altos; Joseph S. Eckerle, Redwood City; Hugh F. Frohbach, Sunnyvale; Russell T. Wolfram, Los Altos, all of Calif.

[73] Assignee: Mitutoyo Manufacturing Co., Ltd., Tokyo, Japan

[21] Appl. No.: 665,525

[22] Filed: Oct. 26, 1984

[30] Foreign Application Priority Data

Oct. 27, 1983 [JP] Japan ............................ 58-201674

[51] Int. Cl.[4] ............................................ G08C 19/10
[52] U.S. Cl. ........................ 340/870.37; 340/870.25; 324/61 P
[58] Field of Search ............................ 340/870.37, 2; 324/61 R; 33/DIG. 1

[56] References Cited

U.S. PATENT DOCUMENTS

| | | |
|---|---|---|
| 3,068,457 | 12/1962 | Nevius . |
| 3,125,716 | 3/1964 | Machlis . |
| 3,219,920 | 11/1965 | Wall . |
| 3,938,113 | 2/1976 | Dobson et al. . |
| 4,092,579 | 5/1978 | Weit . |
| 4,238,781 | 12/1980 | Vercellotti et al. ............ 340/870.37 |
| 4,242,666 | 12/1980 | Reschovsky et al. . |
| 4,420,754 | 12/1983 | Andermo ...................... 340/870.37 |
| 4,429,307 | 1/1984 | Fortescue . |
| 4,437,055 | 3/1984 | Meyer . |
| 4,459,702 | 7/1984 | Medwin ......................... 324/61 R |
| 4,654,581 | 3/1987 | Neukermans et al. ......... 340/870.37 |

*Primary Examiner*—John W. Caldwell, Sr.
*Assistant Examiner*—Tyrone Queen
*Attorney, Agent, or Firm*—Parkhurst & Oliff

[57] ABSTRACT

A capacitance type displacement measuring instrument is disclosed in which a change in electric capacity between electrodes due to a change in displacement between two members movable relative to each other is detected on the basis of a change in phase of a detection signal and a displacement value between the two members is measured from the change in the capacity. AC signals are successively applied to transmitting electrodes provided on one of the members at a predetermined pitch by a multiplexer and signals induced in transfer electrodes at a predetermined pitch differing from the aforesaid pitch of the transmitting electrodes are received by pickup electrodes provided on the aforesaid one of the members. The relative displacement is detected from a change in phase of a received signal of substantially triangular waveform, which are obtained by the pickup electrode.

6 Claims, 5 Drawing Figures

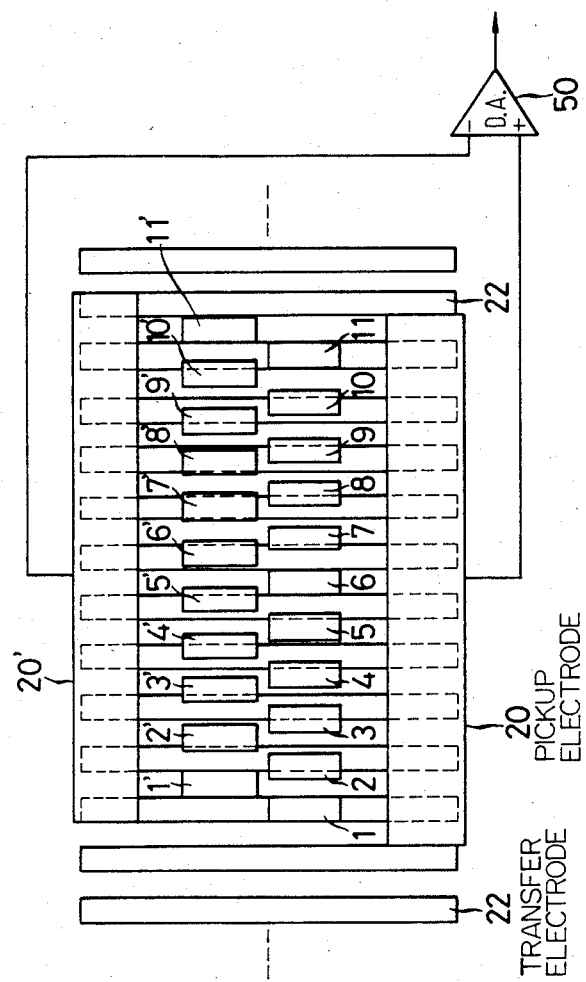

CAPACITANCE TYPE DISPLACEMENT MEASURING INSTRUMENT

BACKGROUND OF THE INVENTION

1. Field of the Invention

This invention relates to capacitance type displacement measuring instruments, and more particularly to improvements in a capacitance type displacement measuring instrument of vernier system, wherein a change in electric capacity between electrodes due to a relative displacement between two members movable relative to each other is detected on the basis of a change in phase of a detection signal, and a relative displacement between both members is measured from the change in the capacity.

2. Description of the Prior Art

In general, in a measuring instrument for measuring a length or the like of an article, when a movement value of articles movable relative to each other, such as a movement value of a measuring element to a main body or a movement value of a slider to a column, there have been know capacitance type displacement measuring instrument, in which a frame member holding a main scale is secured on one hand and a detector including an index scale is secured on the other hand, and a relative displacement value is read by an electrostatic method for example.

Of these capacitance type displacement measuring instruments, particularly as a capacitance type displacement measuring instrument of vernier system in which a change in electric capacity between electrodes due to a relative displacement between two members movable relative to each other is detected on the basis of a change in phase of a detection signal and a relative displacement between the both members is measured from the change in the capacity, there has been proposed one as disclosed in U.S. Pat. No. 3,068,457 for example. However, according to this U.S. Pat. No. 3,068,457, to obtain the vernier action, the electrodes provided on one of the members movable relative to each other are formed into complementary sine wave pattern electrodes and two pairs of the sine wave pattern electrodes are shifted in phase through 90 degrees from each other. Thus, such disadvantages have been presented that the members are increased in a dimension in the widthwise direction, and moreover, it is difficult to accurately form the two pairs of the sine wave pattern electrodes in a manner to be shifted in phase.

Furthermore, in Japanese Patent Laid-Open No. 94354/79 (corresponding to U.S. Pat. No. 4,420,754) for example, there has been proposed one in which a pair of electrodes are used and frequencies are shifted from each other in a signal processing circuit, to thereby attain the vernier action. However, such a disadvantage has been presented that the circuit arrangement becomes considerably complicated.

SUMMARY OF THE INVENTION

The present invention has been developed to obviate the above-described disadvantages of the prior art and has as its object the provision of a capacitance type displacement measuring instrument of vernier system in which the vernier action can be attained without the configurations and arrangement of electrodes being complicated and the circuit arrangement being complicated, so that the measuring instrument can be rendered compact in size.

To this end, the present invention contemplates that, in a capacitance type displacement measuring instrument of vernier system, wherein a change in electric capacity between electrodes due to a change in displacement between two members movable relative to each other is detected on the basis of a change in phase of a detection signal and a displacement value between the two members is measured from the change in the capacity, the measuring instrument comprises:

an oscillator for generating alternating current (AC) signals of a predetermined amplitude;

a multiplexer for successively changing over the AC signals from the aforesaid oscillator;

transmitting electrodes at least for one cycle provided on one of the aforesaid members movable relative to each other at a predetermined pitch in the moving direction of the member, to which the AC signals are successively applied by the aforesaid multiplexer;

a multitude of transfer electrodes provided on the other of the aforesaid members movable relative to each other at a predetermined pitch differing from the aforesaid transmitting electrodes in the moving direction of the member, part of which are opposed to the aforesaid transmitting electrodes;

pickup electrode(s) provided on the aforesaid one of the members in the moving direction of the member and opposed to the remaining part of the aforesaid transfer electrodes; and phase detecting means for detecting a change in phase of received signals of substantially triangular waveform obtained by the pickup electrode(s).

According to the present invention, on one of the members movable relative to each other, there are provided the transmitting electrodes at least for one cycle at a predetermined pitch in the moving direction of the member, to which AC signals are sucessively applied by the multiplexer and pickup electrode(s) provided in the moving direction of the member, while, on the other of the members movable relative to each other, there are provided a multitude of transfer electrodes provided in the moving direction of the member at a predetermined pitch differing from the aforesaid transmitting electrodes and opposed to the transmitting electrodes and the pickup electrode(s), whereby a relative displacement between the two members movable relative to each other is measured on the basis of a change in phase of the received signals of substantially triangular form obtained by the pickup electrode(s), so that the vernier action can be attained without the configurations and arrangement of the electrodes and circuit being complicated, thereby easily rendering the measuring instrument compact in size.

A specific form of the present invention is of such an arrangement that two pairs of the transmitting electrodes are provided in a manner to be shifted in phase through 180 degrees from each other and a change in phase of a differential signal of received signals obtained by two pairs of the pickup electrodes opposed to the aforesaid transmitting electrodes is detected, so that high measuring accuracy can be achieved.

Another specific form of the present invention is of such an arrangement that the phase detecting means includes:

a clock;

a scan counter for outputting a scan signal to the multiplexer in response to an output from the aforesaid clock;

a decoder for generating a time reference signal for every scan cycle in response to an output from the aforesaid scan counter;

a current amplifier for amplifying output(s) from the pickup electrode(s);

an envelope wave detector for obtaining an envelope signal of substantially triangular waveform from an output of the aforesaid current amplifier;

a comparator for obtaining a zero crossing signal of AC waveform, after removing a component of direct current (DC) from the aforesaid envelope signal outputted by the aforesaid envelope wave detector; and a position counter for starting the counting of clock signals in response to the aforesaid time reference signal from the aforesaid decoder and obtaining a position counting value corresponding to a change in phase of a received signal by stopping the counting in response to the aforesaid zero crossing signal from the aforesaid comparator;

so that the phase detecting means can be obtained in relatively simplified arrangement.

A further specific form of the present invention is of such an arrangement that a divider is provided between the clock and the scan counter, so that the resolution of the position counter can be improved.

A still further specific form of the present invention is of such an arrangement that, as the current amplifier, one having very low input impedance is used, so that an output therefrom is proportional to a capacitance between the transmitting electrodes and the transfer electrodes.

A still further specific form of the present invention is of such an arrangement that the envelope wave detector comprises a diode and a simple RC filter, so that the envelope wave detector can be obtained in a very simplified arrangement.

A still further specific form of the present invention is of such an arrangement that the position counter repeatedly counts from zero to the maximum counted value and starts the counting of the clock signals at a reference position, where a zero switch is turned on, after the zero crossing point of the envelope signal, so that a relative displacement from any desired position can be easily measured.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 5 is a plan view showing the arrangement of electrodes in a second embodiment of the capacitance type linear displacement measuring instrument, to which is the present invention is applied.

DETAILED DESCRIPTION OF THE INVENTION

Detailed description will hereunder be given the embodiments of the capacitance type linear displacement measuring instrument, to which the present invention is applied with reference with the drawings.

Figure 1:
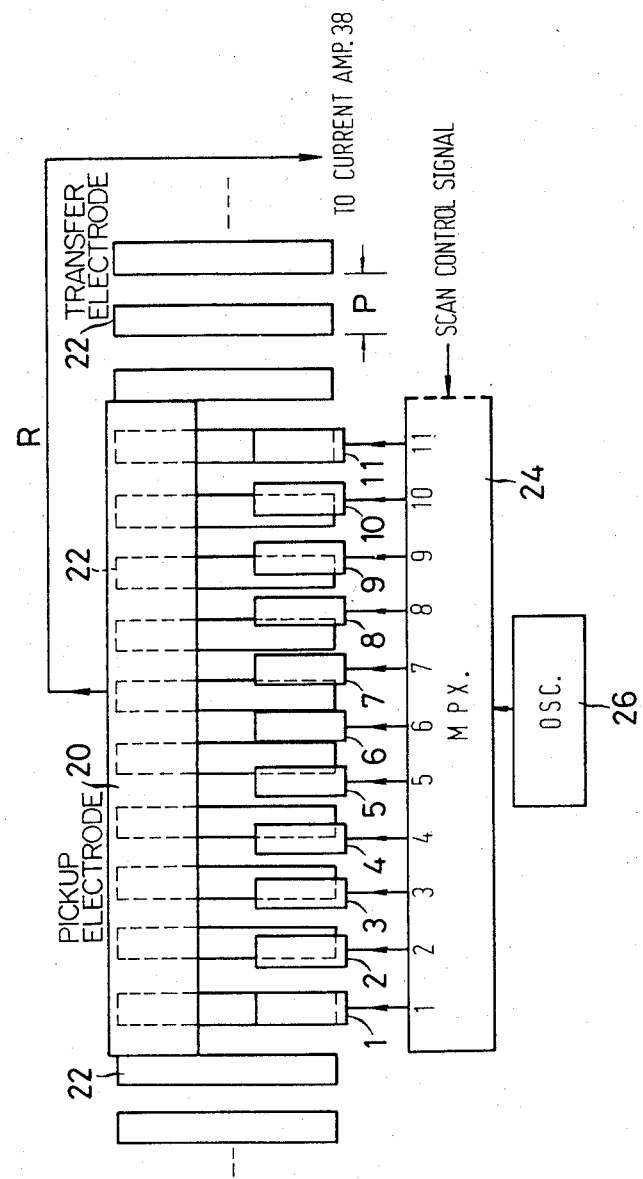
FIG. 1 is a plan view showing the arrangement of the electrodes in a first embodiment of the capacitance type linear displacement measuring instrument, to which the present invention is applied.

The electrodes used in the first embodiment of the present invention are arranged as shown in FIG. 1. More specifically, on a movable member or slider, there are provided a row of metallic transmitting plates (electrodes) 1-11 and a metallic pickup plate (electrode) 20. In the other hand, on a stationary member or stator, there is provided a row of metallic transfer plates (electrodes) 22. The transmitting plates 1-11 and the pickup plate 20 on the slider and the transfer plates 22 on the stator are separated from each other through a thin dielectric. A pitch at which the transfer plates are provided, is P. The transfer plates 1-11 are provided at 10 pitches within 9P. As apparent from FIG. 1, when the slider is positioned such that the transmitting plate 1 is completely overlapped with the transfer plate 22, thereafter, overlapped areas between the transmitting plates and the transfer plates, i.e. electric capacity between the plates decrease until zero appears at the transmitting plate 6, and thereupon, increase to the maximum value again at the transmitting plate 11. This relationship is utilized for generating electric triangular waveforms, through the agency of which a phase to fixed time reference is converted into a straight line in accordance with mechanical displacement of the slider to the stator.

Figure 2:
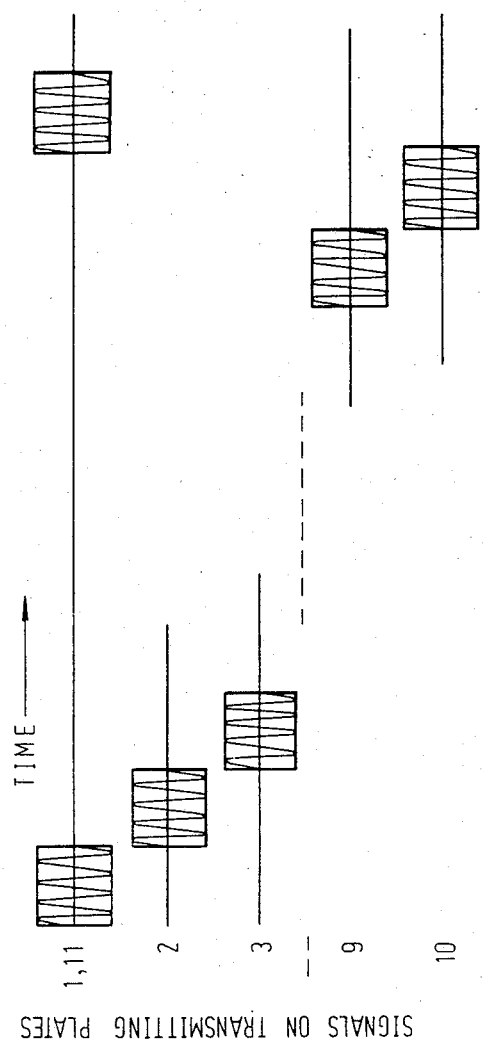
FIG. 2 is a chart showing the signals applied to the transmitting electrodes through the multiplexer in the first embodiment.

As shown in FIG. 1, the transmitting plates 1-11 are individually excited by outputs from the multiplexer 24. An input to the multiplexer 24 is excited by an oscillator 26 of a predetermined amplitude, which is operated at such a high frequency as to be able to provide sufficient electric coupling through the reactance of the capacity between the plates. Scan control signals cause the multiplexer 24 to switch the signal of the oscillator 26 to each plate, one at a time, in succession from 1 to 10, and then to 1 again to repeat the cycle. The transmitting plate 11 is the first of a second series of plates, and would be connected to the transmitting plate 1 inside the multiplexer 24. So each transmitting signal, shown in FIG. 2 on a time scale, appears on the individual transmitting plate. The signals on the transmitting plates 1-11 are each coupled by the transfer plate 22 to the signal pickup plate 20 during their assigned time segments in the scan cycle. The amplitude of each signal coupled to the pickup plate 20 is directly proportional to the overlap and thus the capacity between each transmitting plate and transfer plates 22, the composite signal appearing on the pickup plate 20 will be like the waveform labelled R in FIG. 3. The envelope of this waveform R after wave detection and filtering is also shown.

If the slider is then moved from the position shown in FIG. 1 to the right, such that each transmitting plate succeeding the transmitting plate 1 in turn overlaps completely its associated transfer plate 22, the segment of the composite R waveform having maximum amplitude will move from time segment 1 to time segment 2, etc., of the multiplexer scan cycle, and the other waveform segments having lower amplitudes will also move to later time segments. The envelope of the entire composite waveform will, therefore, move in time or phase relative to a time reference such as the start of time segment 1. The phase of the envelope will shift one complete cycle, or 360 degrees, relative to the time reference, for a slider movement of the pitch P.

Figure 4:
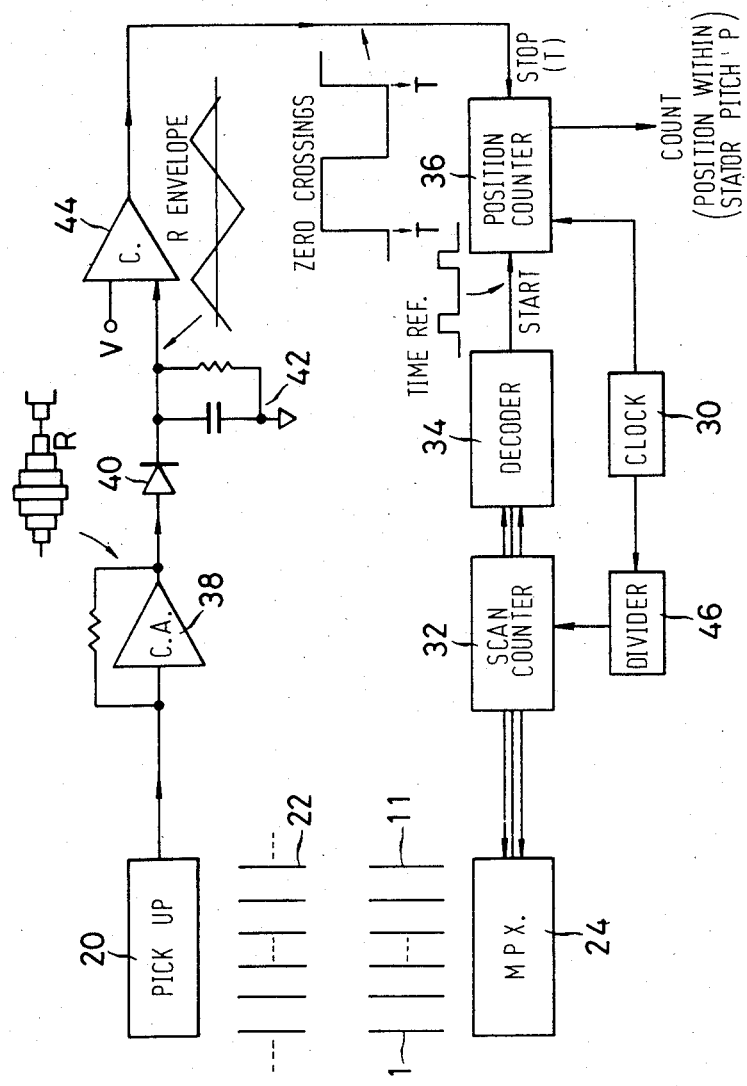
FIG. 4 is a block diagram showing the arrangement of the signal processing circuit in the first embodiment.

A simplified electronic circuit for converting the envelope phase shift to a numerical value is shown in FIG. 4. Referring to the drawing, a clock 30 continuously increments a scan counter 32 whose outputs are used to control the multiplexer 24. The scan counter 32 also drives a decoder 34 that generates a time reference pulse at the same time in each scan cycle. This time reference pulse then starts the position counter 36 which is then incremented by clock signals from the clock 30. The received signals from the pickup plate 20 are amplified by a current amplifier 38 having a zero input impedance. This helps to insure that the output signal amplitudes will be directly proportional to the capacity between the transmitting plate and the transfer plate.

Figure 3:
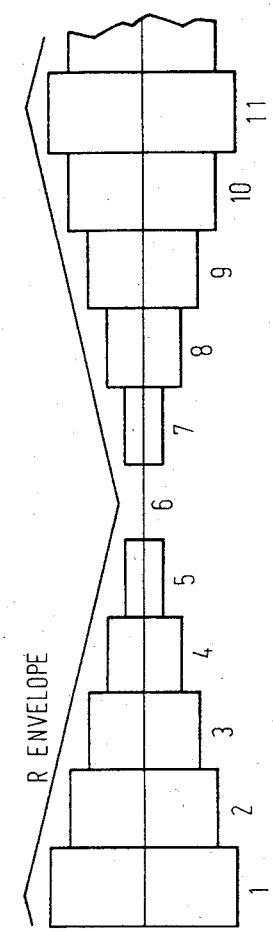
FIG. 3 is a chart showing the received signal appearing in the pickup electrodes in the first embodiment.

The R waveform at the output of the current amplifier 38, shown here shifted 180 degrees from the waveform in FIG. 3, is envelope wave detected by an envelope wave detector comprising a diode 40 and simple RC filter 42. The envelope signal then drives an amplitude comparator 44 which is offset by a reference voltage V set to cause output switching at the zero crossing points of the envelope when it is considered as an AC waveform having no DC component. The minus to plus transitions of the comparator (44) output signal then stop the incrementing of the position counter 36. The position counter 36 is reset to zero at each start time, so the counted value at the stop time is proportional to slider displacement within any one stator pitch interval.

One useful feature for a practical instrument is the ability to zero the display counted value at any position of the slider, so measurements relative to that position can be made easily. A modification to the operation of the system described above would provide this function. Namely, instead of resetting the position counter 36 to zero at the start of each scan cycle, the position counter 36 would be allowed to increment repeatedly from zero through its full count range. And, depressing a zeroing button switch would cause the position counter 36 to be reset to zero at the minus to plus zero crossing transition of the R waveform envelope. In effect, the position counter 36 is resynchronized so that a count of one occurs at the first clock pulse following the zero crossing. When the zeroing switch was released, subsequent zero crossing would cause the counter value to be strobed into a display storage register, but would not stop the counter 36 as before. If the slider remained at the reference position, a counted value of zero would be continuously strobed into the display register. If the slider was then moved from the reference position, the zero crossings would occur at different times, and strobed counted values relative to the original zero reference time or position would be obtained.

In the circuit described above, if the same clock frequency drives both the scan counter 32 and the position counter 36, then the resolution of the position counter (36) reading relative to the pitch P will be 1/10, as determined by the number of plates driven during a complete scan cycle of the multiplexer 24. In contrast thereto, if a frequency divider 46 is used between the clock 30 and the scan counter 32 as shown in FIG. 4, then the resolution will be increased to 1/10 divided by the divider ratio. For a divider ratio of 10 for example, the resolution of the position counter 36 would be P/100.

In a practical system, additional circuitry would be required to count the number of stator pitch intervals traversed by slider movement. This count would be combined with the vernier count to produce the total distance moved by the slider from a initial zero value starting point.

In the above embodiment, one set of the transmitting plates 1–11 and the pickup plate 20 has been provided, however, as in the second embodiment shown in FIG. 5 for example, two sets of the transmitting plates 1–11 and 1'–11' and shifted in phase through 180 degrees from each other, and two sets of pickup plates 20 and 20' corresponding thereto are disposed, a differential signal of pickup signals from the pickup plates 20 and 20' is obtained by a differential amplifier 50, and it is possible to measure a displacement of the slider from a change in phase of the differential signal.

In all of the above embodiments, the present invention has been applied to the linear displacement measuring instrument, however, the scope of application of the present invention need not necessarily be limited to this, and it is clear that the present invention is similarly applicable to the rotary displacement measuring instrument such as a rotary encoder.

What is claimed is:

1. A capacitance type displacement measuring instrument having two members movable relative to each other in a moving direction and carrying electrodes thereon, wherein a change in electric capacity between the electrodes due to a change in displacement between the two members is detected on the basis of a change in phase of a detection signal and a displacement value between said two members is measured from the change in the capacity, said measuring instrument comprising:
   an oscillator for generating an alternating current (AC) signal of a predetermined amplitude;
   a multiplexer for successively sampling the AC signal from said oscillator;
   transmitting electrodes provided on one of said members, said transmitting electrodes being arranged to correspond to at least one cycle of said AC signal at a predetermined pitch in the moving direction of said member, said AC signal being successively applied by said multiplexer to successive transmitting electrodes;
   a plurality of transfer electrodes provided on the other of said members, said transfer electrodes being arranged at a predetermined pitch differing from the predetermined pitch of said transmitting electrodes, part of said transfer electrodes being opposed to said transmitting electrodes;
   at least one pickup electrode provided on said one of said members and opposed to a remaining part of the transfer electrodes; and
   phase detecting means for detecting a change in phase of pickup signals of a substantially triangular waveform detected by said at least one pickup electrode.

2. A capacitance type displacement measuring instrument as set forth in claim 1, wherein first and second pairs of said transmitting electrodes are provided such that a first pair of transmitting electrodes is shifted in phase through 180 degrees from a second pair of transmitting electrodes and a change in phase of a differential signal of received signals obtained by said first and second pairs of said pickup electrodes opposed to said transmitting electrodes is detected.

3. A capacitance type displacement measuring instrument as set forth in claim 1, wherein said phase detecting means comprises:
   a clock;
   a scan counter for outputting a scan signal to said multiplexer in response to an output from said clock;
   a decoder for generating a time reference signal for every scan cycle in response to an output from said scan counter;
   a current amplifier for amplifying output from the at least one pickup electrode;
   an envelope wave detector for obtaining an envelope signal of substantially triangular waveform from an output of said current amplifier;
   a comparator for obtaining a zero crossing signal of said envelope signal, after removing a component of direct current (DC) from said envelope signal outputted by said envelope wave detector; and
   a position counter for starting the counting of clock signals in response to said time reference signal from said decoder and obtaining a position counting value corresponding to a change in phase of a received signal by stopping the counting in response to said zero crossing signal from said comparator.

4. A capacitance type displacement measuring instrument as set forth in claim 3, wherein a divider is provided between said clock and said scan counter.

5. A capacitance type displacement measuring instrument as set forth in claim 3, wherein said envelope wave detector comprises a diode and a simple RC filter.

6. A capacitance type displacement measuring instrument as set forth in claim 3, wherein said position counter repeatedly counts from zero to the maximum counted value and starts the counting of said clock signals at a reference position, where a zero switch is turned on, after the zero crossing point of said envelope signal.

* * * * *